United States Patent
Wenig et al.

(10) Patent No.: US 8,042,055 B2
(45) Date of Patent: Oct. 18, 2011

(54) REPLAYING CAPTURED NETWORK INTERACTIONS

(75) Inventors: Robert I. Wenig, San Francisco, CA (US); Kirk R. Saathoff, San Francisco, CA (US); Albert F. Gettier, Forest Hill, MD (US)

(73) Assignee: TeaLeaf Technology, Inc., San Francisco, CA (US)

(*) Notice: Subject to any disclaimer, the term of this patent is extended or adjusted under 35 U.S.C. 154(b) by 782 days.

(21) Appl. No.: 12/049,245

(22) Filed: Mar. 14, 2008

(65) Prior Publication Data
US 2009/0063968 A1    Mar. 5, 2009

Related U.S. Application Data

(60) Provisional application No. 60/969,537, filed on Aug. 31, 2007.

(51) Int. Cl.
G06F 15/00    (2006.01)
G06F 13/00    (2006.01)

(52) U.S. Cl. ........................................ 715/763; 715/765

(58) Field of Classification Search .......... 715/763–765, 715/740–744, 851–853
See application file for complete search history.

(56) References Cited

U.S. PATENT DOCUMENTS

| | | |
|---|---|---|
| 5,463,547 A | 10/1995 | Markowitz |
| 5,564,043 A | 10/1996 | Siefert |
| 5,577,254 A | 11/1996 | Gilbert |
| 5,699,526 A | 12/1997 | Siefert |
| 5,715,314 A | 2/1998 | Payne |
| 5,717,879 A | 2/1998 | Moran et al. |
| 5,721,906 A | 2/1998 | Siefert |
| 5,751,962 A | 5/1998 | Fanshier et al. |
| 5,774,552 A | 6/1998 | Grimmer |
| 5,781,735 A | 7/1998 | Southard |
| 5,809,250 A | 9/1998 | Kisor |
| 5,825,880 A | 10/1998 | Sudia |
| 5,832,458 A | 11/1998 | Jones |
| 5,832,496 A | 11/1998 | Anand et al. |
| 5,845,124 A | 12/1998 | Berman |
| 5,848,396 A | 12/1998 | Gerace |
| 5,848,412 A | 12/1998 | Rowland et al. |
| 5,857,188 A | 1/1999 | Douglas |
| 5,867,578 A | 2/1999 | Brickell |
| 5,894,516 A | 4/1999 | Brandenburg |

(Continued)

FOREIGN PATENT DOCUMENTS

CA    2656539    2/2008

(Continued)

OTHER PUBLICATIONS

International Search Report for PCT/US08/65582; Date of Mailing Sep. 11, 2008.

(Continued)

*Primary Examiner* — Cao "Kevin" Nguyen
(74) *Attorney, Agent, or Firm* — Stolowitz Ford Cowger LLP

(57) ABSTRACT

A user interface event monitor captures user interface events executed by a client during a network session. A network session monitor captures network data exchanged between the client and a web application during the network session. A replay device identifies control events in the network session that require execution before replaying associated user interface events. Replay of the user interface events are delayed by the replay device until the associated control events have been fully executed.

18 Claims, 16 Drawing Sheets

U.S. PATENT DOCUMENTS

| | | |
|---|---|---|
| 5,903,652 A | 5/1999 | Mital |
| 5,905,868 A | 5/1999 | Baghai et al. |
| 5,909,492 A | 6/1999 | Payne |
| 5,930,786 A | 7/1999 | Carino, Jr. et al. |
| 5,933,601 A | 8/1999 | Fanshier et al. |
| 5,941,957 A | 8/1999 | Ingrassia, Jr. et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,991,791 A | 11/1999 | Siefert |
| 6,006,228 A | 12/1999 | McCollum et al. |
| 6,026,403 A | 2/2000 | Siefert |
| 6,035,332 A | 3/2000 | Ingrassia, Jr. et al. |
| 6,085,223 A | 7/2000 | Carino, Jr. et al. |
| 6,151,584 A | 11/2000 | Papierniak et al. |
| 6,151,601 A | 11/2000 | Papierniak et al. |
| 6,169,997 B1 | 1/2001 | Papierniak et al. |
| 6,253,203 B1 | 6/2001 | O'Flaherty et al. |
| 6,286,030 B1 | 9/2001 | Wenig |
| 6,286,098 B1 | 9/2001 | Wenig |
| 6,295,550 B1 | 9/2001 | Choung et al. |
| 6,317,794 B1 | 11/2001 | Papierniak et al. |
| 6,334,110 B1 | 12/2001 | Walter et al. |
| 6,397,256 B1 | 5/2002 | Chan |
| 6,418,439 B1 | 7/2002 | Papierniak et al. |
| 6,480,855 B1 | 11/2002 | Siefert |
| 6,489,980 B1 | 12/2002 | Scott et al. |
| 6,502,096 B1 | 12/2002 | Siefert |
| 6,519,600 B1 | 2/2003 | Siefert |
| 6,651,072 B1 | 11/2003 | Carino, Jr. et al. |
| 6,658,453 B1 | 12/2003 | Dattatri |
| 6,671,687 B1 | 12/2003 | Pederson et al. |
| 6,714,931 B1 | 3/2004 | Papierniak et al. |
| 6,850,975 B1 | 2/2005 | Daneels et al. |
| 7,260,837 B2 * | 8/2007 | Abraham et al. ............ 726/4 |
| 7,272,639 B1 | 9/2007 | Levergood |
| 7,580,996 B1 | 8/2009 | Allan |
| RE41,903 E | 10/2010 | Wenig |
| 2002/0049840 A1 | 4/2002 | Squire |
| 2002/0056091 A1 | 5/2002 | Bala |
| 2003/0154289 A1 | 8/2003 | Williamson et al. |
| 2004/0019675 A1 | 1/2004 | Hebeler |
| 2004/0100507 A1 * | 5/2004 | Hayner et al. ............ 345/855 |
| 2005/0021713 A1 | 1/2005 | Dugan et al. |
| 2005/0066037 A1 | 3/2005 | Song et al. |
| 2005/0071464 A1 | 3/2005 | Kuwata et al. |
| 2005/0188080 A1 | 8/2005 | Motsinger et al. |
| 2006/0048214 A1 | 3/2006 | Pennington et al. |
| 2006/0075088 A1 | 4/2006 | Guo |
| 2008/0005793 A1 | 1/2008 | Wenig |
| 2009/0247193 A1 | 10/2009 | Kalavade |
| 2010/0042573 A1 | 2/2010 | Wenig |

FOREIGN PATENT DOCUMENTS

| | | |
|---|---|---|
| CA | 2696884 | 3/2009 |
| EP | 0843449 | 5/1998 |
| EP | 0326283 | 8/1998 |
| EP | 1097428 | 6/2002 |
| EP | 07840244.3 | 2/2008 |
| EP | 0876998.9 | 3/2009 |
| GB | 2357680 | 6/2008 |
| WO | 9825372 | 6/1998 |
| WO | WO 98/26571 | 6/1998 |
| WO | 9836520 | 8/1998 |
| WO | 0013371 | 3/2000 |
| WO | 0217165 | 2/2002 |
| WO | 2008/019193 | 2/2008 |
| WO | 2009/029316 | 3/2009 |
| WO | 2010019258 | 2/2010 |

OTHER PUBLICATIONS

International Search Report for PCT/US2007/071096; Date of mailing May 13, 2008.
Al-Qaimare G., et al., Kaldi: A Computer-Aided Usability Engineering Tool for Supporting Testing and Analysis of Human-Computer Interation:, Computer-Aided Design of User Interfaces. Proceedings of the International Conference on Computer-Aided Design of User Interfaces, Proceedings of CADUI, xx, xx, Oct. 21, 1999, pp. 337-355.
Stolowitz Ford Cowger Listing of Related Cases; Apr. 13, 2010.
Smith et al., "Automated Protocol Analysis," Human Computer Interaction, 8:101-145, 1993.
Bishop, Matt et al., "A Model of Security Monitoring", Department of Mathematics and Computer Scince, Dartmouth College, pp. 46-52.
Written Opinion of the International Searching Authority for PCT/US08/65582; Mailing date Sep. 11, 2008.
Written Opinion of the International Searching Authority for PCT/US07/71096; Mailing date May 13, 2008.
Stolowitz Ford Cowger Listing of Related Cases Nov. 29, 2010.
Written Opinion of the International Searching Authority for PCT/US2011/033813; Mailing Date Jul. 28, 2011.
PCT Search Report for PCT/US2011/033813; Mailing Date Jul. 28, 2011.

* cited by examiner

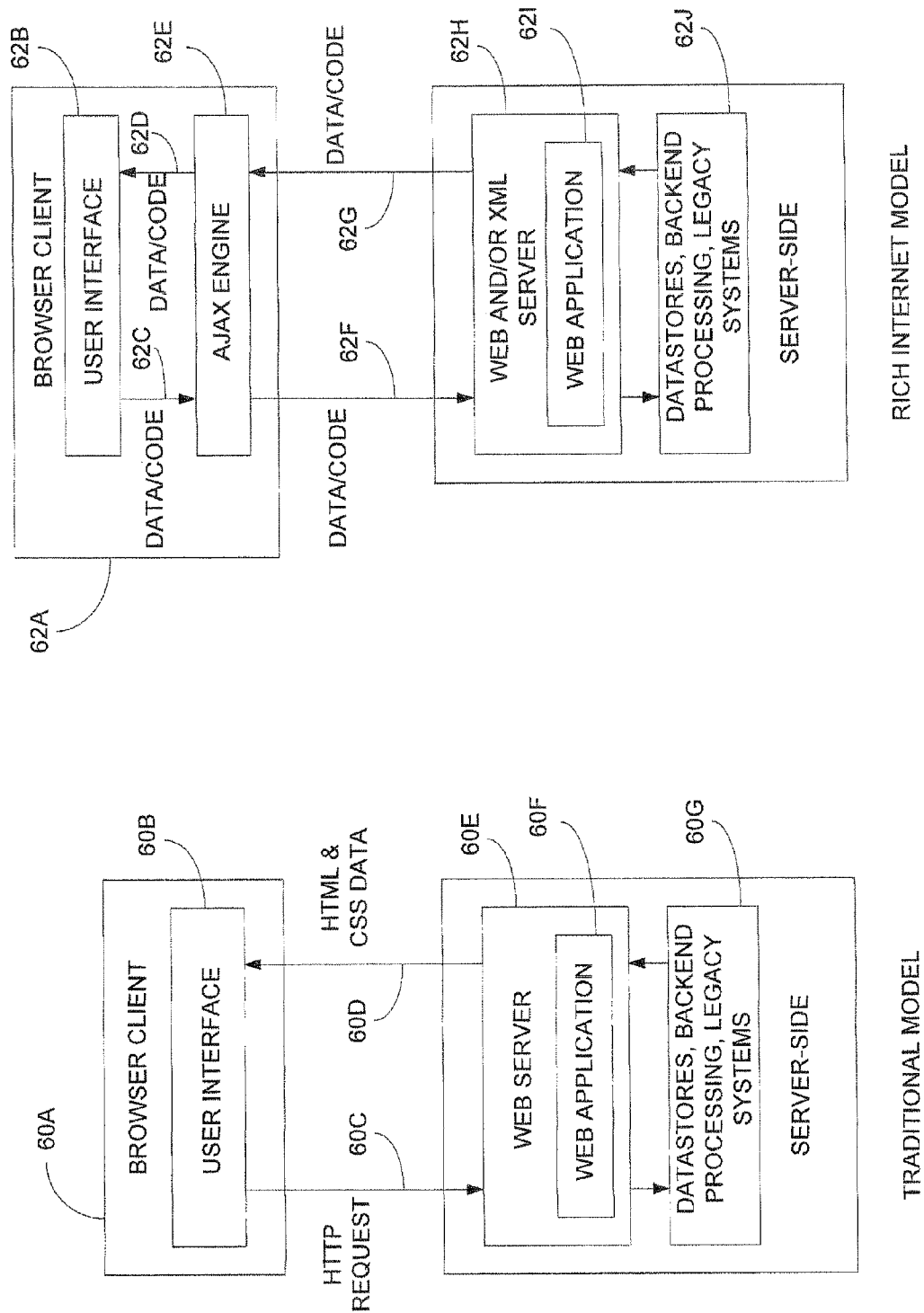

FIG. 2

FLIGHT SEARCH

Website name  72

● ROUND TRIP  74    ○ ONE-WAY  76

FROM  78
POR

TO  80

90
Pori, Finland – Pori (POR)
Portland, OR – Portland (PDX)
Portland, ME – Portland (PWM)
Port Of Spain/Trinidad – Piarco (POS)
Port Au Prince, Haiti – Mais Gate (PAP)
Porto,Portugal – Porto (OPO)
Porlamar, Venezuela – DelCaribe Marino (PMV)
Portsmouth, NH – Pease International (PSM)

RETURN DATE  86
10/14/07

TIME  88
EVENING

- 70
- 72 Website name
- FLIGHT SEARCH
- 74 ● ROUND TRIP
- 76 ○ ONE-WAY
- 78 FROM PORTLAND, OREGON
- 80 TO SAN FRANCISCO, CA
- 82 LEAVE DATE 10/5/07
- 84 TIME MORNING
- 86 RETURN DATE 10/14/07
- 88 TIME EVENING
- 89 SEARCH

REPLAYING CAPTURED NETWORK INTERACTIONS

BACKGROUND

Users access web applications on remote web servers. In one example, the web application allows users to purchase certain products or services online. However, the user may experience problems while conducting the online purchase. For example, the web application may crash every time the user selects an icon on a web page used for the online purchase. In another situation, the user may not be able to determine how to complete the online product purchase from the instructions displayed on the web page. In a different situation, the web application may prevent the user from selecting particular items. In yet another situation, the web site may slow down or crash during certain periods of time or for particular operations. These are just a few of the many problems that may arise during an online network session.

These problems can negatively affect an e-commerce business. For example, a negative user experience during the online session may cause a potential customer to give up and abort the purchase of a particular product. Even worse, the potential customer may stop visiting the web site. Accordingly, it is important to be able to monitor user experiences during online sessions and identify any problems.

Systems currently exist for monitoring web sites. However, a challenge exists replaying the events captured during the web site monitoring. For example, web pages used today execute code that operates more independently from the web server and contains more state information. These rich web pages make it more difficult to accurately replay a previously captured Internet session.

BRIEF DESCRIPTION OF THE DRAWINGS

FIGS. 1B, 1C, and 1D compare traditional Internet applications with Rich Internet Applications (RIA).

FIG. 2 is a diagram of a web page for making on-line airline reservations.

FIG. 3 is the web page in FIG. 2 showing a drop down menu control event.

FIG. 11 shows the web page in FIG. 2 fully populated just before a new web page is rendered.

DETAILED DESCRIPTION

Figure 1A:
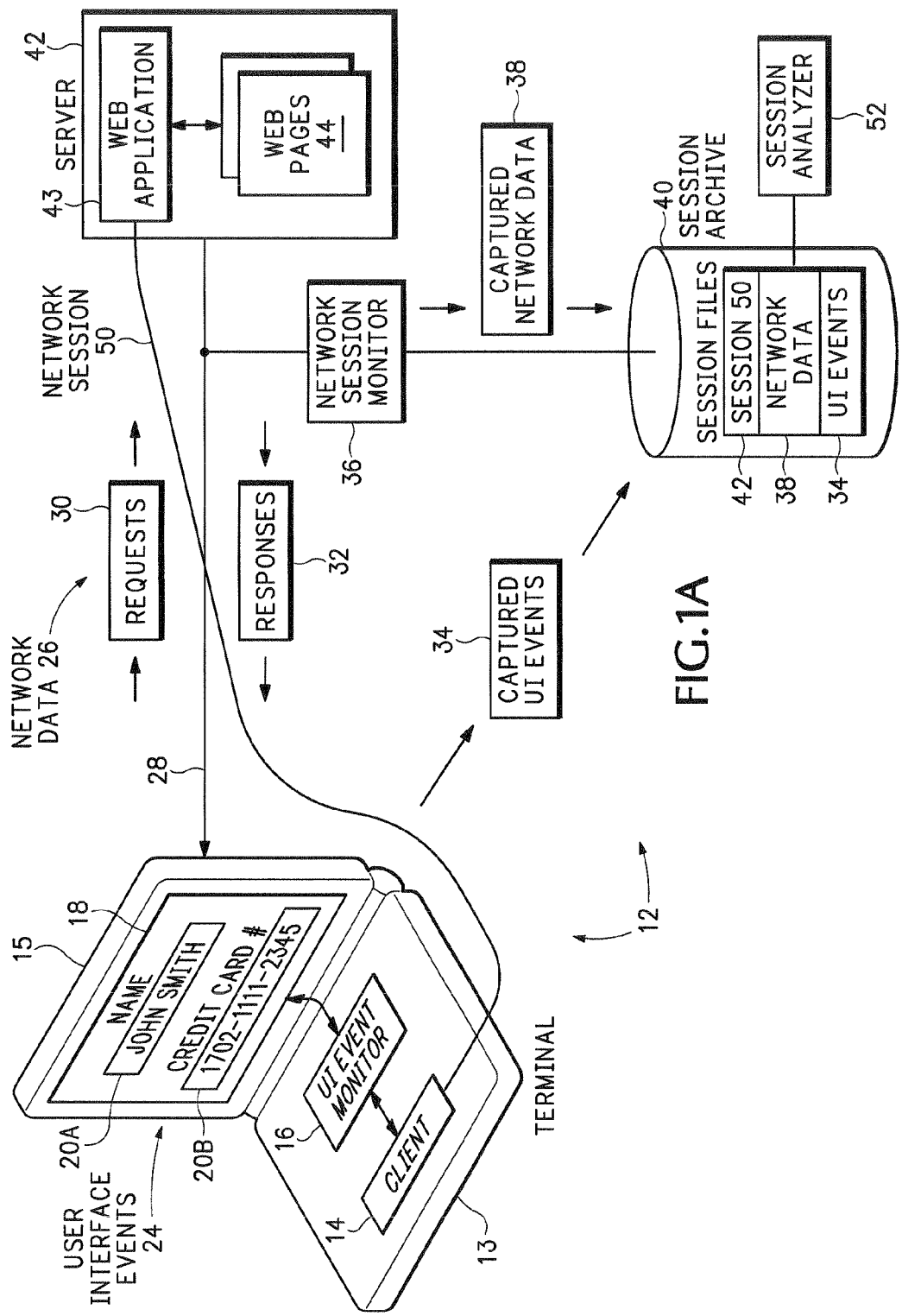
FIG. 1A is a diagram showing an Event Tracking and Replay (ETR) system.

FIG. 1A shows an Event Tracking and Replay (ETR) system 12. A client 14 operating on a terminal 13 establishes a network session 50 with a web application 43 operating on a web server 42. Many of the network sessions conducted over the web are stateless in that the network connections are dynamically created and torn down as needed. Therefore, logical user sessions may consist of multiple network sessions. It should be understood that the ETR system 12 can be used with any variety of network sessions or logical user sessions that may be established over a network.

The terminal 13 can be any device used for accessing or exchanging information with server 42 over a network 28. The terminal 13 in some examples may be a Personal Computer (PC), laptop computer, wireless Personal Digital Assistant (PDA), cellular telephone, or any other wired or wireless device that can access and exchange web information with web application 43.

The server 42 is any computing system that can operate one or more web applications 43 that are accessed by different clients 14. The web application 43 could be used for conducting any type of online session such as online purchases or online financial services. However, these are just examples, and any type of electronic web based transaction or other online activity can be performed using web application 43. The client 14 may use a web browser 15 to access and interact with web application 43. For simplicity, only one client 14 is shown in FIG. 1. However, it should be understood that multiple different clients 14 may exist and be monitored.

A user of client 14 accesses the web application 43 on server 42. For example, using HyperText Transport Protocol (HTTP) or HTTP over Secure Sockets Layer (SSL) (HTTPS). According to different requests 30, the web application 43 sends different responses 32 back to the client 14 that may include different web pages 44, web page logic or control, or other data used during the web session 50. The series of requests 30 and responses 32 for a same network session 50 is referred to generally as network data 38. In this example, a User Interface (UI) 15, such as a web browser on terminal 13, is currently displaying a web page 18 provided by the web application 43. The web page 18 includes two fields 20A and 20B that prompt a user to enter a name and credit card number, respectively.

The user enters information into fields 20A and 20B and may then select an "enter" icon (not shown) that causes the information in fields 20A and 20B to be sent back to web application 43 as additional requests 30. The web application 43 may then send back other network data, such as responses 32 according to the information contained in previous requests 30. In this example, the next response 32 from web application 43 may be information confirming the completion of an online transaction that used the user information previously entered into fields 20A and 20B. In other instances, the responses 32 can include other web pages, or other information used in a next stage of the web session 50.

Network Monitoring

The ETR system 12 includes a network session monitor 36 that captures the network data 38 that may include the requests 30 and responses 32 exchanged between the client 14 and web application 43 over the network 28. The ETR system 12 also includes a UI event monitor 16 that captures user interface events 34 performed by client 14 that include, but is not limited to, events that may only occur locally on terminal 13.

Capturing both the network data 38 and UI events 34 for a network/web session 50 allow the ETR system 12 to monitor and reproduce network sessions with a higher level of granularity and reproduce and detect events that may not be discoverable with existing network monitoring systems. As a result, the ETR system 12 can provide analytics for a wider array of network session events that may happen during customer online experiences.

In order to power a visual replay and accurately understand the true user experience during that network session, all of the network data 38 and all of the user interface events 34 associated with that network session 50 need to be captured. Alternatively, screen shots could be taken and captured for every state change during the network session 50. However this would require capturing large amounts of data and would not scale well when multiple different network sessions needed to be captured and replayed. The ETR system 12 resolves these issues by capturing and marrying the network traffic 38 (server side) with the client events 34 in order to provide a scalable and secure means of capturing each and every user experience for any number of network sessions 50.

One example of a network session monitor 36 is described in U.S. Pat. No. 6,286,030 issued Sep. 4, 2001, entitled: Systems and Methods For Recording and Visually Recreating Sessions in a Client-Server Environment; and also described in U.S. Pat. No. 6,286,098 issued Sep. 4, 2001, entitled: System and Method For Encrypting Audit. Information in Network Applications, which are both herein incorporated by reference in their entirety.

The network session monitor 36 monitors the network 28 for any network data 38 that is transferred between web application 43 and client 14 over network 28 during network session 50. For example, the network data 30 and 32 may include web pages 44 sent from web application 43 to client 14 and information sent from client 14 back to web application 43, such as the information entered into fields 20A and 20B.

The network data 38 can also include web page logic/code that is sent by web application 43 along with the web pages 44 to the client 14. This web page logic is then executed locally on the terminal 13 by client 14. An example of web page logic may include Javascript. But of course any type of web page executable logic may be used. Network data 38 can also include web session data that may not necessarily include web pages 44, but alternatively includes information that is used with a previously supplied web page 44. The significance of these types of network data 38 is described in more detail below.

The network session monitor 36 may be located anywhere on the network 28 where the network data 38 can be captured for network session 50. In one example, the network session monitor 36 may operate on the same server 42 that operates the web application 43. In another embodiment, the network session monitor 36 could operate on a separate server that might be located within the same enterprise network as server 42. In another embodiment, the network session monitor 36 is located somewhere else in packet switched network 28. In yet another embodiment, the network session monitor 36 may operate on the same terminal 13 that operates the UI event monitor 16.

Many of the events that happen during the network session 50 may not necessarily be transferred over network 28. Thus, network session monitor 36 may only capture a portion of the information that is required to thoroughly analyze the network session 50. For example, the individual key strokes or cursor selections used for entering information into fields 20A and 20B of web page 18 may never be transferred back over network 28 to the web application. Alternatively, a batch data transfer of only the completed information from web page 18 may be transferred to web application 43 over network 28. Further, the logic sent along with the web pages 44 may autonomously change the state of a web page or the state of the web session locally on terminal 13 without ever sending information back over the network 28 to web application 43. This presents a problem when trying to fully analyze a user experience during a previously occurring network session 50.

User Interface Event Monitoring

The UI event monitor 16 is used in conjunction with the network session monitor 36 to increase the visibility and recreation granularity of online user experiences. The UI event monitor 16 monitors and captures UI events 34 that interact with the network data 38 for the network session 50. The UI event monitor 16, in one example, is a Javascript application that is downloaded to the browser 15 operated by client 14 via a Hyper Text Markup Language (HTML) tag. Of course, other types of software can also be used for implementing the UI event monitor 16.

The UI event monitor 16 operates autonomously from web application 43 and detects certain UI events 34 associated with a particular network session 50 established between the web browser client 14 and web application 43. By operating locally on terminal 13, the UI event monitor 16 can detect certain or selected events performed by client 14 on web page 18. For example, the UI event monitor 16 can detect each character entered into the fields 20A and 20B. The UI event monitor 16 can also detect when a user selects different icons displayed on the web page 18 or when the user makes selections on the web page that cause the web session to display another web page or web link or that generally change the state of the web session 50. Some of these UI events 34, or sequence of events, might only be detectable locally on terminal 13 and never transferred over network 28.

The local UI events 34 associated with the network session 50 are captured by the UI event monitor 16 and then automatically transferred as captured UI events 34 to a session archive 40. Similarly, the network session monitor 36 sends the captured network data 38 for the network session 50 to the same session archive 40. A session analyzer tool 52 is then used to analyze the captured network data 38 and the captured UI events 34 for the network session 50.

The ETR system 12 provides the unique combination of capturing both network data 38 exchanged between client 14 and web application 43 during a web session 50 as well as capturing the UI events 34 that are entered locally by a user when interacting with the network data 38. Based on what analytics need to be preformed, the captured network data 38 and captured UI events 34 may be analyzed separately, in combination, or synchronized together to virtually replay the previous network session 50.

Replaying Rich Internet Applications

A traditional web application operates as shown in FIG. 1B. Most user actions in a user interface 60B trigger an HTTP request 60C back to a web server 60E. The web application 60F on web server 60E does some processing 60G involved with retrieving data, crunching numbers, talking to various legacy systems, and then returns HTML pages and Cascading Style Sheets (CSS) 60D to the browser client 60A.

FIG. 1C shows how rich internet applications, such as AJAX, Flash, Flex, and Web 2.0, differ from the traditional web applications described in FIG. 1B.

Ajax, is a group of inter-related web development techniques used for creating interactive web applications. A primary characteristic is the increased responsiveness and interactivity of web pages achieved by exchanging small amounts of data with the server "behind the scenes" so that the entire web page does not have to be reloaded each time there is a need to fetch data from the server. This is intended to increase the web page's interactivity, speed, functionality, and usability.

AJAX is asynchronous in that extra data is requested from the server and loaded in the background without interfering with the display and behavior of the existing page. JavaScript is the scripting language in which AJAX function calls are usually made. Data is retrieved using an XMLHttpRequest object that is available to scripting languages run in modern browsers, or alternatively remote scripting in browsers that do not support XMLHttpRequest. There is, however, no requirement that the asynchronous content be formatted in XML.

Flash technology is used for adding animation and interactivity to web pages. Flash is commonly used to create animation, advertisements, various web page components, to integrate video into web pages, and more recently, to develop rich Internet applications. Flex is used for the development and deployment of cross platform, rich Internet applications based on the Adobe Flash platform. Flex uses an XML-based markup language that provides a way to quickly build and lay out graphic user interfaces.

Web 2.0 websites allow users to do more than just retrieve information and allow users to run software-applications entirely through a browser. Users can own the data on a Web 2.0 site and exercise control over that data. This stands in contrast to old traditional websites, the sort which limited visitors to viewing and whose content only the site's owner could modify. Web 2.0 sites often feature a rich, user-friendly interface based on Ajax, Flex or similar rich media.

Referring to FIGS. 1B and 1C, user actions in user interface 62B generate user actions 62C to an AJAX engine 62E. The user actions 62C can either request more data, code or instructions or send up data or code/instructions for processing by the web application 62I. The AJAX engine 62E interprets the data or code/instructions (user action) 62C and either provides responses 62D back to the user interface 62B or sends corresponding HTTP requests 62F with the data or code/instructions to a Web and/or XML server 62H.

For the data or code 62F, the web application 62I on server 62H again does processing 62J involved with retrieving data, crunching numbers, talking to various legacy systems and then returns the responsive data or code 62G to the AJAX engine 62E. The AJAX engine 62E uses Javascript to interpret the data or code 62G returned from the web application 62I and sends the interpreted results to the user interface 62B.

In the traditional web application in FIG. 1B, every state change in the application 60F results in a server side request for a new page. With rich internet applications as shown in FIG. 1C, the client 62A (i.e. the browser) becomes more than a rendering engine. The client 62A contains logic, rules, data caching and more.

Every user action that would normally generate an HTTP request 60C in FIG. 1B instead takes the form of data or code 62C sent to the AJAX engine 62E in FIG. 1C. The AJAX engine 62E handles on its own any response to the user action that does not require a trip back to the server 62H, such as simple data validation, editing data in memory, and even some navigation. The AJAX engine 62E may need something from the server 62H in order to respond to the user action 62C, such as submitting data for processing, loading additional interface code, or retrieving new data. The AJAX engine 62E makes those requests asynchronously without stalling user interactions with the application 62I.

Figure 1D:
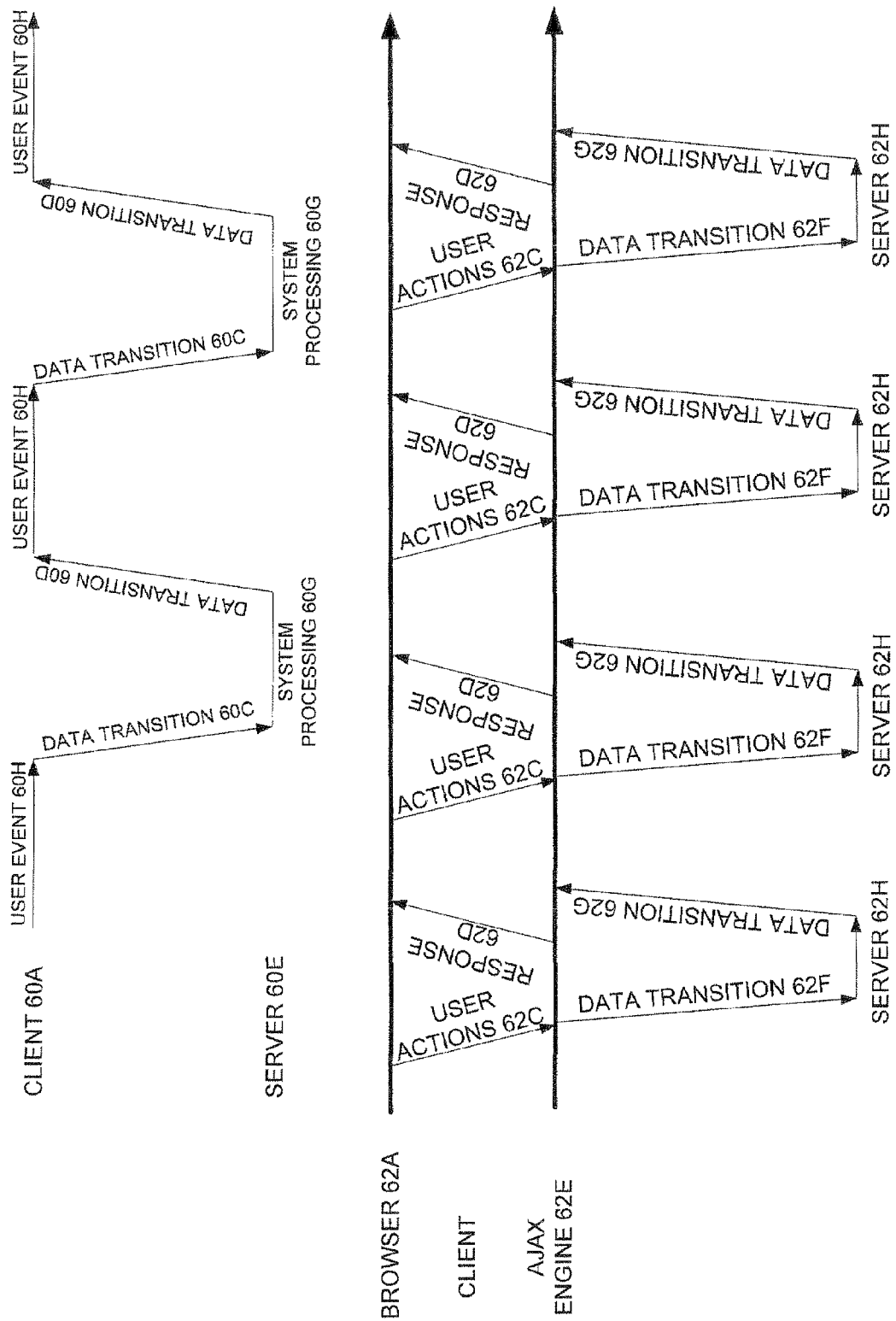

To explain in more detail, the top of FIG. 1D shows a synchronous interaction pattern of a traditional web application and the bottom of FIG. 1D shows an asynchronous pattern of an AJAX web application.

Each user event 62H from client 60A is sent as a data transition 60C for system processing 60G in the web server 60E. The results from the system processing 60G are sent as data transitions 60D back to the client 60A. A next user event 60H from the client 60A is then sent as a next data transition 60C for system processing 60G. This process is repeated serially for each user event 60H.

The bottom of FIG. 1D shows how AJAX applications eliminate this start-stop-start-stop nature of interaction on the Web by using the intermediary AJAX engine 62E between the browser 62A and the server 62H. While it would seem that adding a layer to the web application would make it less responsive, the opposite is true.

The AJAX engine 62E is responsible for both rendering the interface 62B (FIG. 1C) that the user sees and communicating with the server 62H on behalf of the user. The AJAX engine 62E allows user interactions with the application to happen asynchronously, independent of communication with the server 62H. This prevents the user from having to stare at a blank browser window and an hourglass icon, waiting for a response back from the server 62H.

This is illustrated in the bottom half of FIG. 1D where the client browser 62A sends user actions 62C to the AJAX engine 62E. A data transition 62F may be sent when the AJAX engine 62E needs to communicate with the server 62H. However, the AJAX engine 62E can still asynchronously provide other responses 62D to the client browser 62A for other user actions while waiting for data transitions 62G back from the server 62H. Thus, the interactions between client browser 62A and the AJAX engine 62E can be asynchronous with the interactions between AJAX engine 62E and the server 62H.

Figure 2:
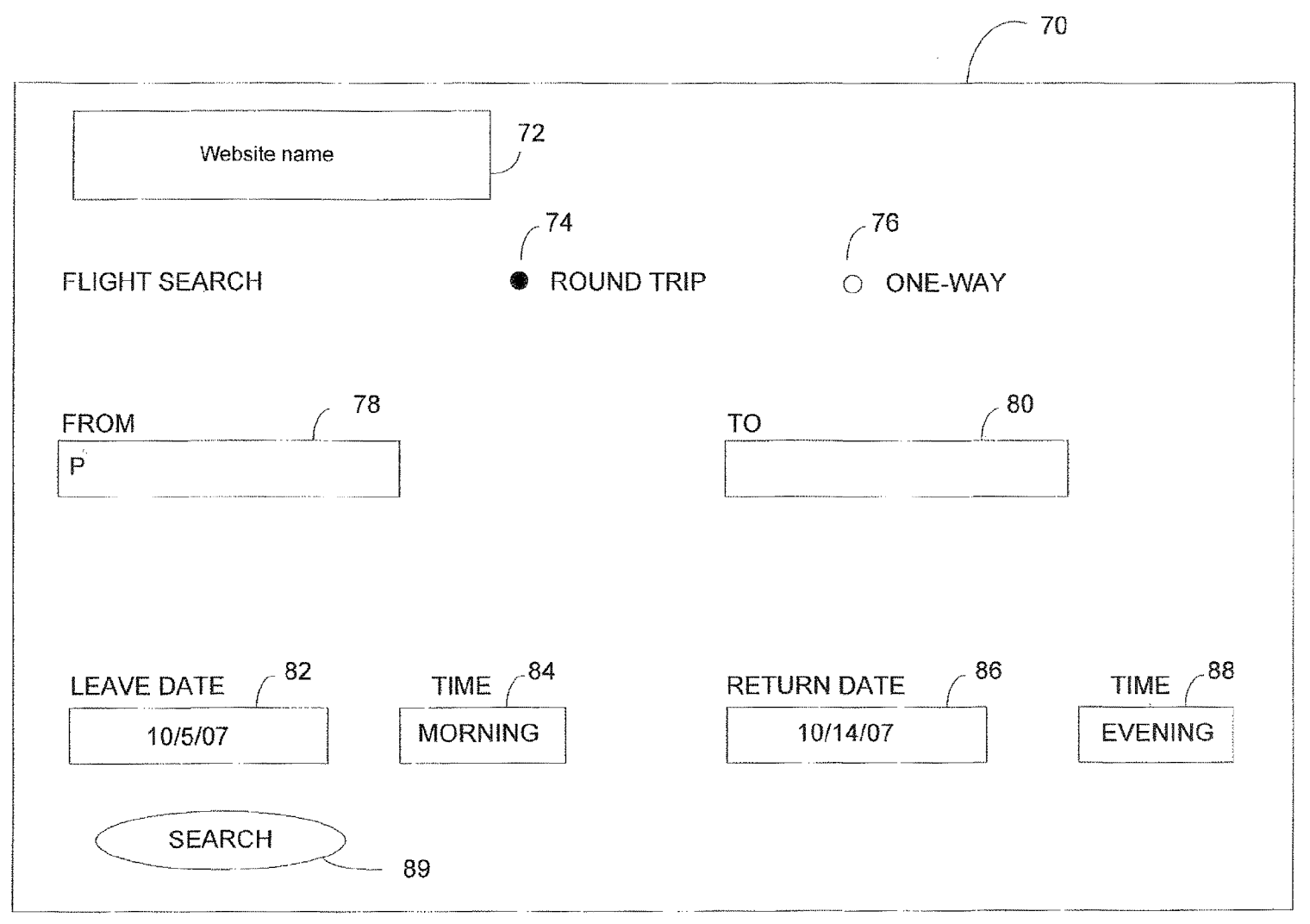

FIG. 2 shows a web page 70 that is monitored for different UI events. In this example, the web page 70 is used in conjunction with an on-line airline reservation application. The web page 70 displays the name of the web site at location 72 and includes different ROUND-TRIP and ONE-WAY fields 74 and 76, respectively, that are selected by a user for booking either a round trip or one-way airline reservation. A FROM field 78 is used for inputting the name of the airport where the plane flight begins and the TO field 80 is used for inputting the name of the airport where the plane flight ends. A LEAVE DATE field 82 and TIME field 84 are used for inputting the desired day and time for the first leg of the plane flight. A RETURN DATE field 86 and TIME field 88 are used for inputting the desired day and time for the second return leg of the plane flight. A search icon 89 is selected by the user when all of the necessary flight information has been entered into fields 74-88.

It should be understood that this is just one example of any type of web page that may be used in conjunction with the replay system described in more detail below. The flight reservation example is used only for illustrative purposes to further explain the replay system. In a current state of the web page 70 shown in FIG. 2, the user has also entered the first letter "P" of the originating airport for the plane reservation.

A "rich Internet application" may include web pages that execute different logic, maintains different states, and displays different information while maintaining the same web page rendering. Any combination of the logic, state, display etc. associated with a next particular UI event is referred to generally as "control".

In this example, the web page 70 monitors the individual characters that are entered into the FROM field 78. When at least three characters are entered into the FROM field 78, the web page 70, or AJAX engine 62E in FIG. 1C, makes a data request to an associated web server, such as the server 42 in FIG. 1. The data request asks the web server 42 to supply the names of all airports that contain the three letters entered into FROM field 78. In this example, the logic in web page 70 requests the web application 43 operating on server 42 to provide the names of all airports that contain the three letters "POR".

Referring to FIG. 3, and pursuant to the data request, the web page 70 receives back a list of all airports containing the three letters "POR". After the list of airports is received back from the server 42, the web page 70 creates and displays a drop-down menu 90 that contains the list of "POR" airports. This allows the user to easily select the desired originating airport for the airline reservation without having to manually type in the entire airport name. A similar process is performed with the TO field 80 where the web page monitors the characters entered by the user. After the user enters some number of characters, the web page 70 again sends a request to the web server 42 for all airports containing the three letters entered into field 80. The list of destination airports is again displayed on a drop down menu similar to menu 90 for selection by the user.

Figure 4:
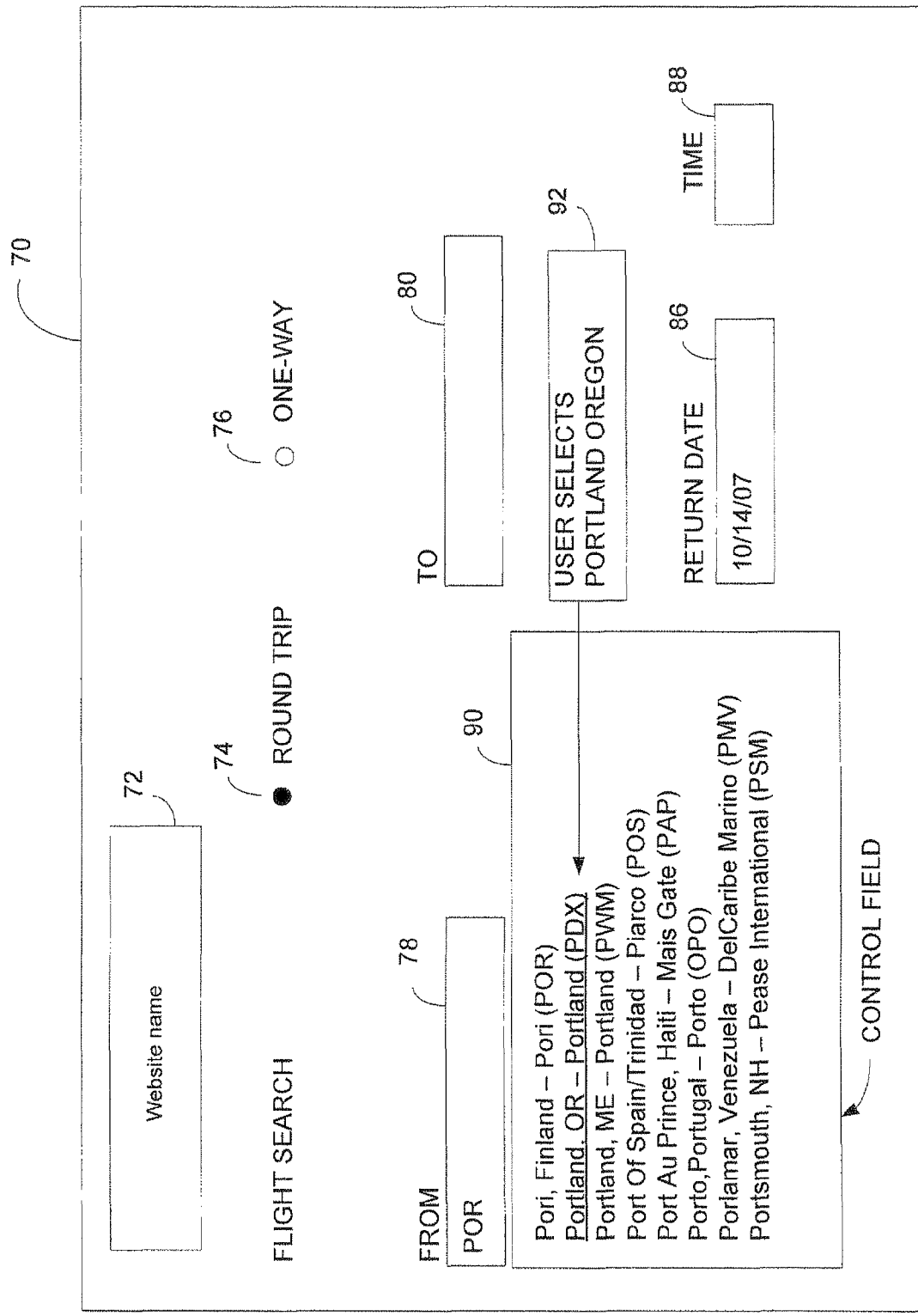
FIG. 4 shows the next User Interface (UI) event where a user selects an airport from the drop down menu control event.

Referring to FIG. 4, the drop down menu 90 and populated list of airports is alternatively referred to as a web page control field, logic state, or simply "control". Control refers to any information, web page logic, displayed web page content, etc. required for properly executing a UI event. In this example, a UI event 92 may be a left mouse click that selects PORTLAND, OREGON from the list of airports in drop down menu 90. The UI event monitor 16 in FIG. 1 captures the left mouse click UI event. However, the left mouse click captured by the UI event monitor 16 in FIG. 1 can only be replayed correctly when the list of airports is properly displayed in drop down menu control 90.

When processing (replaying) the left mouse click UI event 92, it is important that the airport list 90 first exists and is displayed in drop down menu 90. Again, if the web session described above is to be accurately replayed during a subsequent replay session, the sequence of UI events must be accurately sequenced with the associated control. For example, the replayed on-line airline reservation session would fail if the left mouse click 92 were replayed before the airport list in drop down menu 90 was displayed. Premature execution of the left mouse click 90 would likely prevent the correct entry from being entered into the FROM field 78. As a result, replay would not accurately reproduce the original network session.

Figure 5:
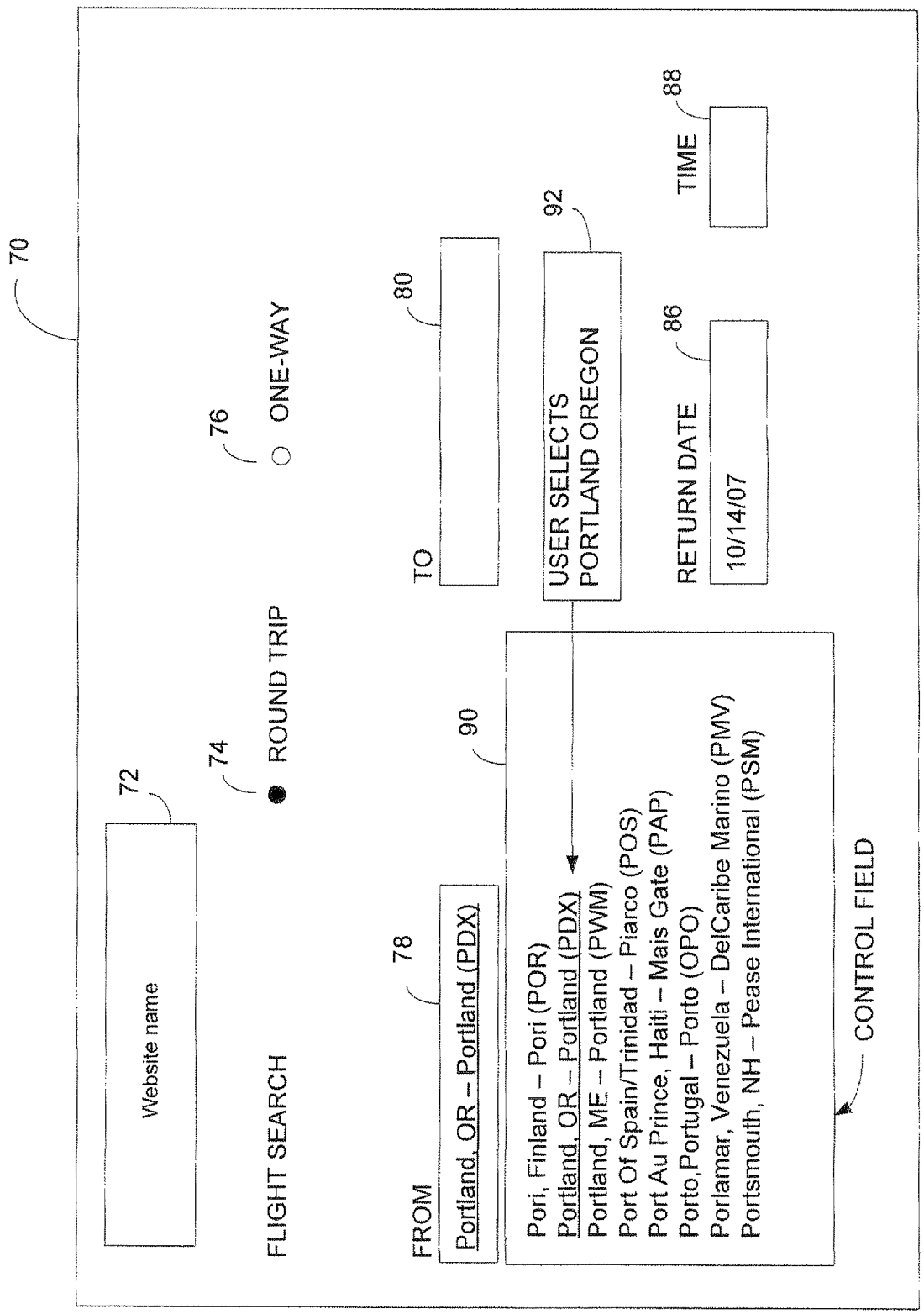
FIG. 5 shows the next control event where the FROM field of the web page is populated with the user selection made in the drop down menu.

FIG. 5 shows the results of the left mouse click UI event 92 selecting PORTLAND, OR from the drop down menu control 90. The FROM field 78 is automatically populated with the airport location selected from drop down menu 90.

The replay system described below determines when captured UI events are ready to be executed based on the availability of the associated control events. This synchronization prevents the captured UI events from being prematurely executed out of sequence and accordingly prevents false errors from being generate during replay of the network session.

Figure 6:
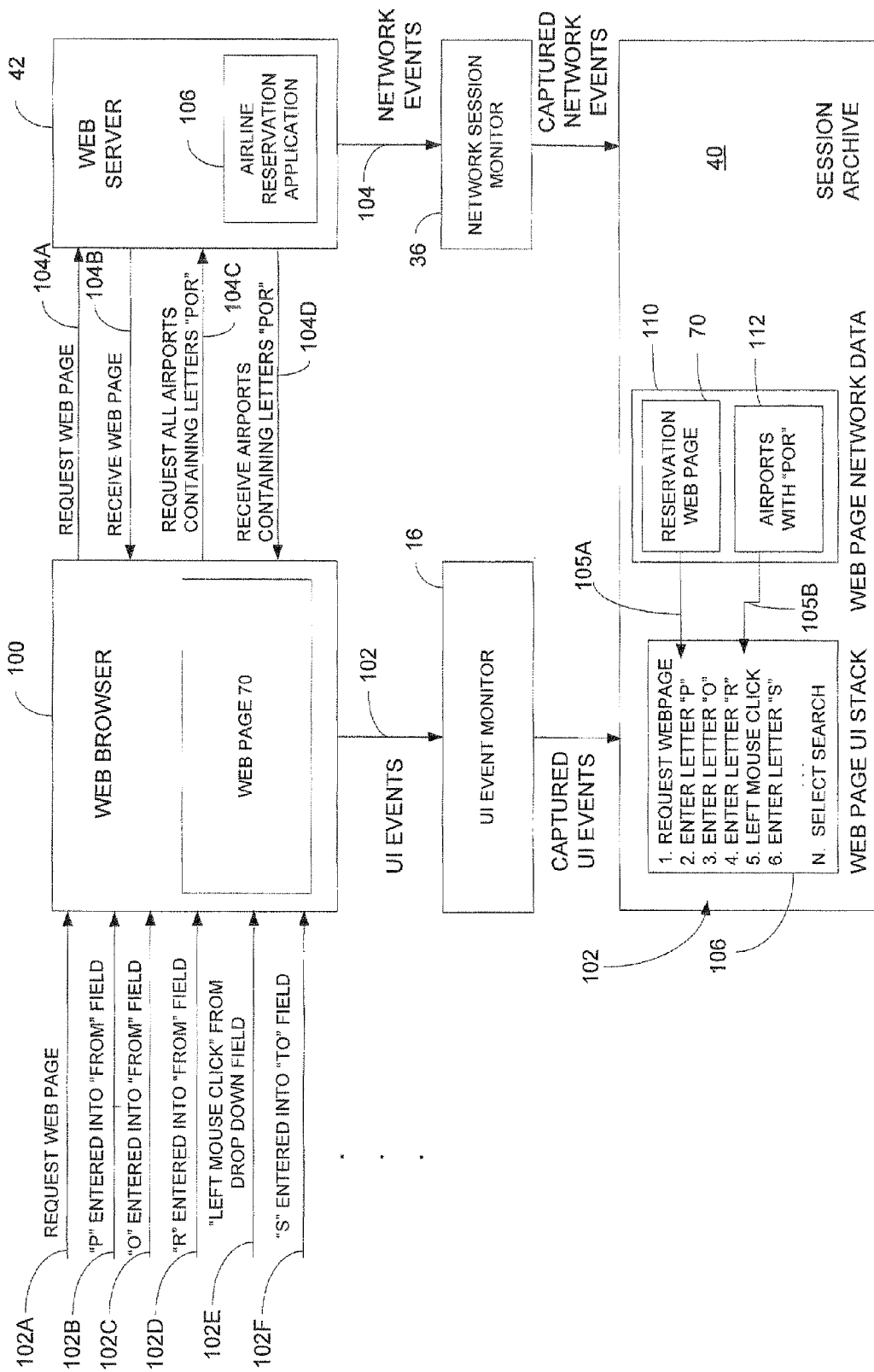
FIG. 6 is a block diagram showing the captured UI events and captured network data associated with the web page shown in FIGS. 2-5.

To explain in more detail, FIG. 6 shows some of the UI events 102 that are entered via a web browser 100 into the web page 70 as previously shown in FIGS. 2-5. The user first enters keystrokes (UI events 102A) that request the airline reservation web page 70 shown above. Accordingly, a network request 104A is sent to the web server 42 that operates the airline reservation application 106. The airline reservation application 106 sends back the airline reservation web page 70 in network response 104B.

After the web page 70 is displayed on the web browser 100, among other keystrokes and other UI events, the user enters the three letters "POR" into the FROM field 78 of web page 70 as previously shown in FIG. 3. These letters are captured as UI events 102B-102D, respectively. As described above, the logic in the web page 70 then sends a network request 104C to the airline reservation application 106 requesting the names of all airports containing the letters "POR". The reservation application 106 sends response 104D back with the list of "POR" airports.

In response to receiving the list of "POR".airports, the logic operated in web page 70 displays the drop down menu 90 previously shown in FIGS. 3 and 4 that contains the list of "POR" airports. The user moves the cursor over the PORTLAND, OR airport in the displayed list and presses the left mouse button in UI event 102E. The logic in web page 70 automatically populates the FROM field 78 with the selected airport as previously shown in FIG. 5. The user then starts entering information into the other fields of web page 70 in UI events 102F.

The UI event monitor 16 captures all of the UI events 102A-102F associated with the web page 70 in a stack 106 on the session archive repository 40. Similarly, the network session monitor 36 captures and stores the network events 104A-104D that are also associated with the web page 70 in the session archive repository 40 as web page data 110. In this example, the web page data 110 includes the web page 70 and the airport list 112 contained in response 104D.

The captured network data 110 is linked via pointers 105A and 105B to the appropriate locations in UI event stack 106. For example, time stamps can be used to indicate when the UI events 102 and the webpage data 110 are captured. The UI events 102 and webpage data 110 can then be interleaved for serial execution according to their associated time stamps.

Alternatively, other web page data 110 could be linked into appropriate locations in UI event stack 106 according to the associated UI event. For example, the UI event 102A that requests the web page 70 may normally be followed in stack 106 by the supplied web page 70 that was the target of request 102A. In this example, the web page 70 would be displayed during replay immediately after UI event 102A.

Figure 7:
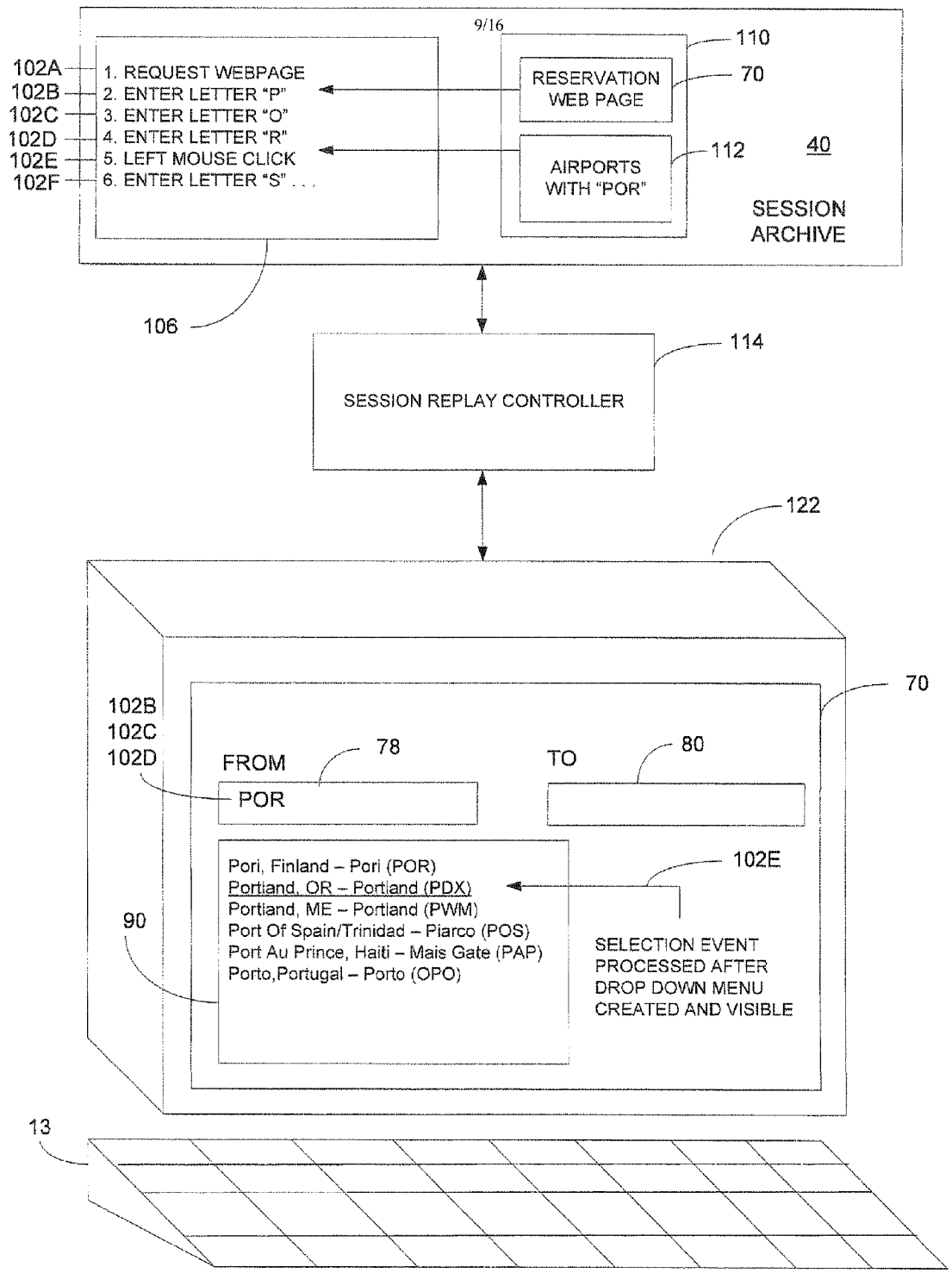
FIG. 7 is a diagram showing how a session replay controller replays the captured network session.

FIG. 7 shows in more detail how a session replay controller 114 ensures client UI events in stack 106 are correctly synchronized with web page data and control 110 for the same captured network session. The session replay controller 114 is implemented in software operated by computer 13.

A particular network session is requested for replaying. Accordingly, the replay controller 114 accesses the UI event stack 106 and web page data 100 for the requested network session in session archive 40.

The replay controller 114 replays the UI event 102A that previously requested web page 70 and then displays the web page 70 as originally displayed to the user during the original web session. The replay controller 114 then replays the captured UI events 102B, 102C, and 102D that the user previously entered into the FROM field 78 of the replayed web page 70.

The replay controller 114 uses special control synchronization after replaying the captured UI events 102B, 102C, and 102D. For example, prior to processing the UI event 102E (left mouse click), the replay controller 114 checks to see if the control associated with the UI event 102E is created and visible on replayed web page 70. For example, the replay controller 114 makes sure that the drop down menu 90 is displayed prior to executing the left mouse click UI event 102E that selects Portland, Oreg. from the drop down menu 90.

Without the synchronization provided by replay controller 114, the replayed UI event 102E could be executed before the replayed web page 70 had a chance to create and display the drop down menu 90 containing the airport list. If this happened, the replay session would incorrectly move into a state that never existed in the original network session and could possibly create error conditions that never occurred during in the original network session.

The session replay controller 114 prevents the asynchronous UI events 102 from being executed out of order with associated states in the web page 70 by verifying that the control events associated with the UI events 102 exist and are visible prior to executing the associated UI events. In the example in FIG. 7 this means that the replay controller 114 first confirms that the replayed drop down menu 90 is displayed and contains the airport list prior to executing the left mouse click UI event 102E.

Sequencing User Events with Control

Figure 8:
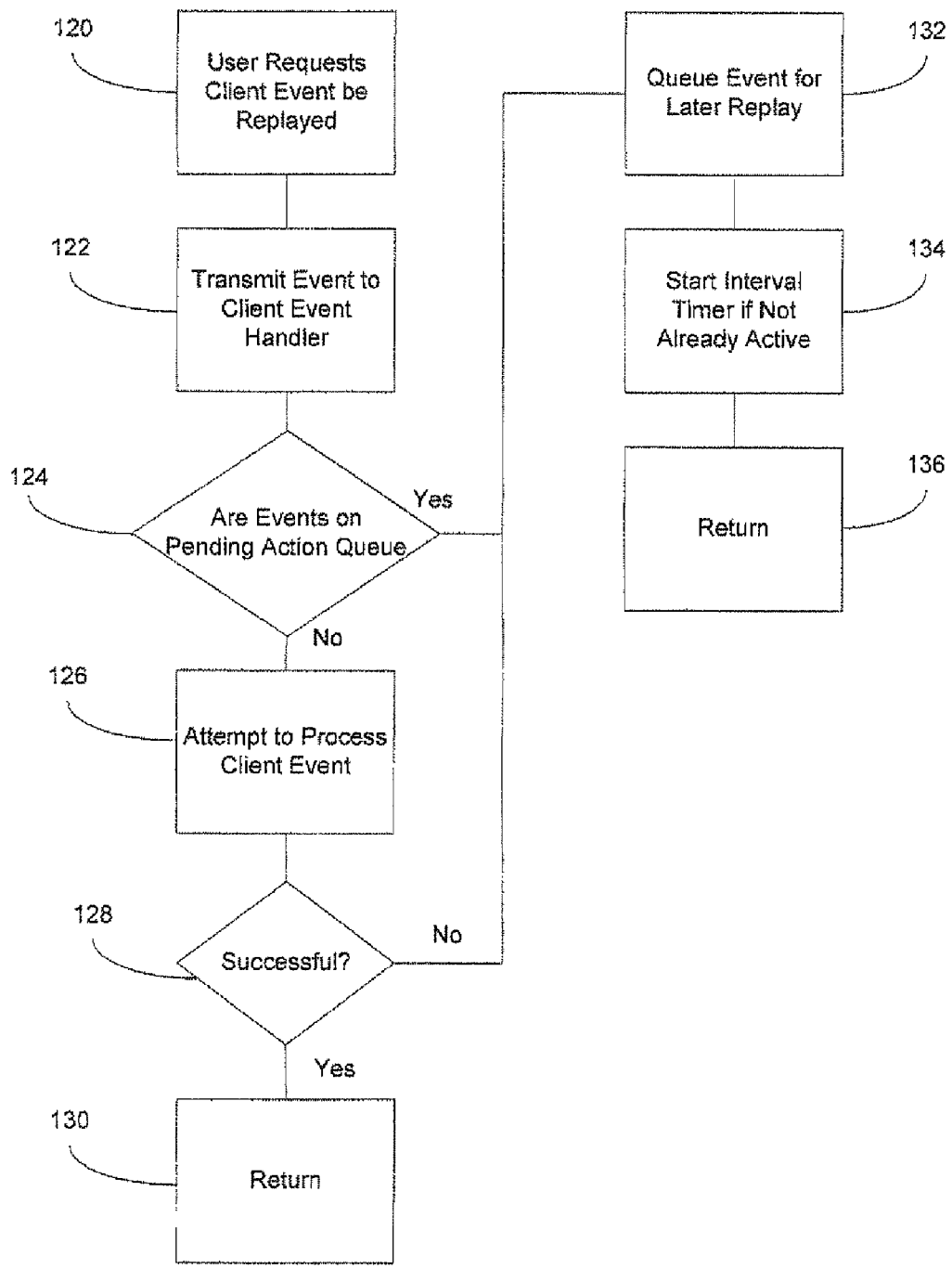
FIGS. 8-10 show how the session replay controller in FIG. 7 synchronizes asynchronous UI events with associated control events.
Figure 9:
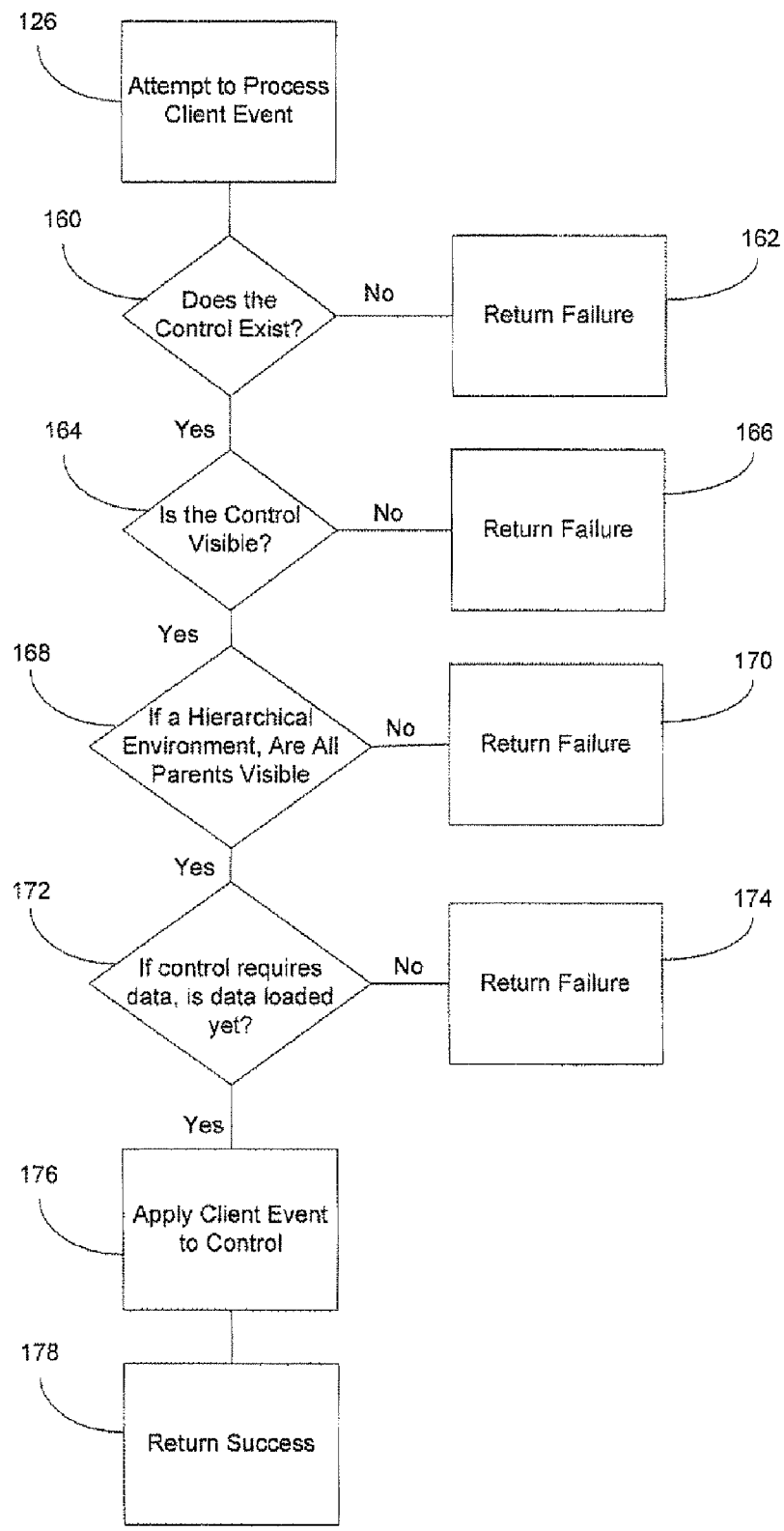
Figure 10:
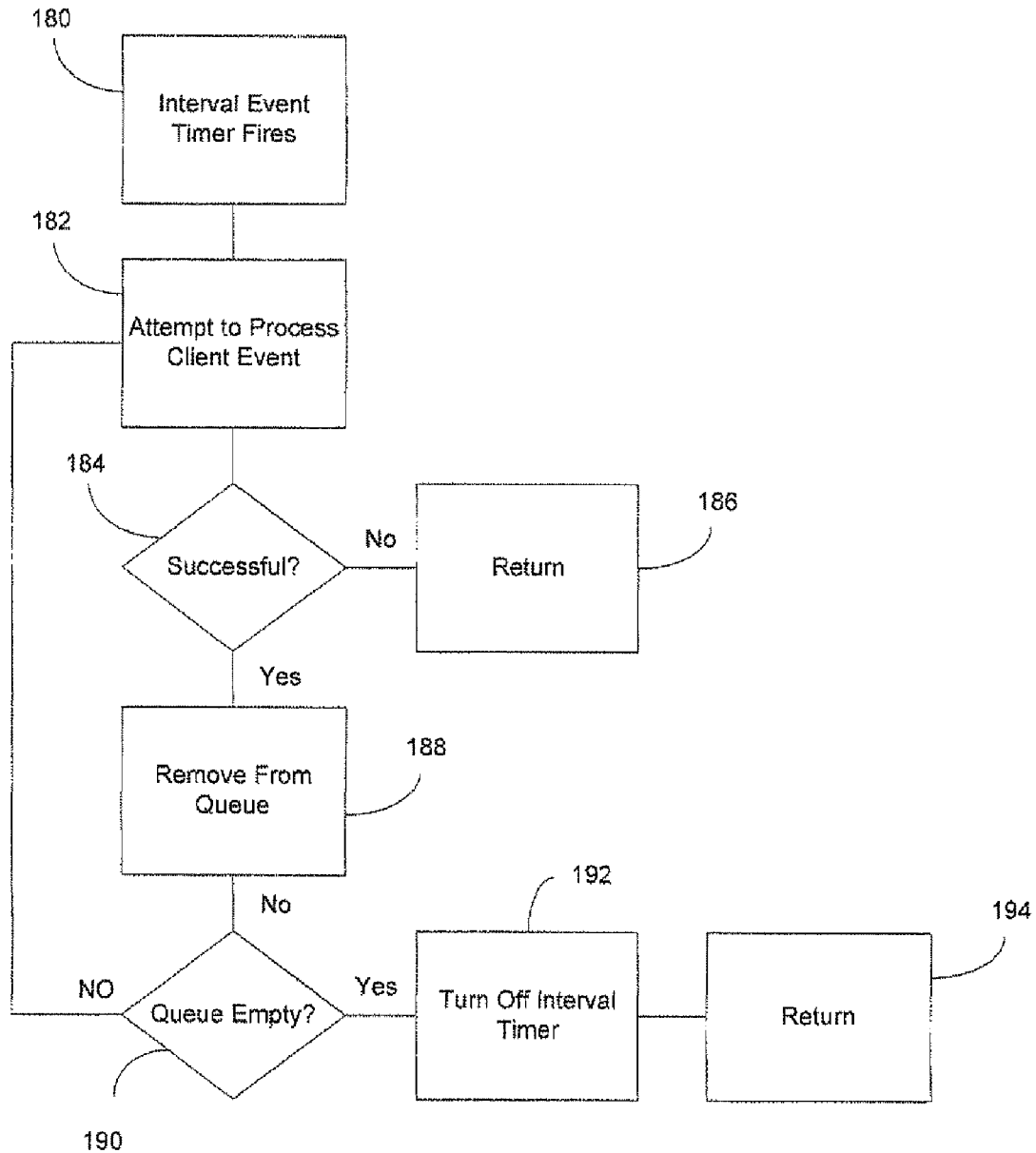

FIGS. 8-10 explain in more detail how UI/client events are synchronized with associated web page control events. Referring to FIG. 8, a user requests replay of a client UI event in operation 120. This may comprise a user operating the replay controller 114 requesting a next client event to be executed, such as the left mouse click event 102E in FIG. 7. The client event is transmitted to a client event handler in operation 122 that is inserted into the web page session.

The client event handler in operation 124 first determines if any other client events are currently pending on a pending action queue. For example, client events 102B-102D may still be waiting to be processed by the replay controller 114 prior to processing the left mouse click client event 102E. If any client events are pending on the action queue in operation 124, then the current client event is placed on the queue after the already queued client events in a first-in first-out order in operation 132. This ensures the client events are processed in the correct order.

If no other client events are pending in the queue, then an attempt is made in operation 126 to process the client event. If processing of the client event is not successful in operation 128, the client event is placed on the pending queue in operation 132. When the client event is successfully processed in operation 128, operation 130 returns control to the replay controller 114. The replay controller 114 then waits for the next user replay request in operation 120. If client events are loaded into the pending queue in operation 132, an interval timer is started in operation 134, if not previously started. Operation 136 then returns to operation 120.

FIG. 9 describes in more detail the operations that are performed by the replay controller 114 when attempting to process the client event in operation 126 in FIG. 8. Operation 160 determines if control exists for the client event. Control can include any activity, function, state, etc. that needs to exist before executing the client event. For example, as shown above in FIG. 7, drop down menu 90 needs to exist with the populated airport list prior to processing the left mouse click 102E that selects one of the displayed airports.

When the control associated with the client event is not present, a failure is returned in operation 162. In FIG. 8, this returned failure 162 causes the client event to be queued for later replay in operations 128 and 132 of FIG. 8. If control for the client event exists, operation 164 checks to see if the control is visible. For example, a user would not have clicked the left mouse button if the drop down menu 90 previously shown in FIG. 4 was not yet visible. Thus, if the control is not visible, a failure is returned in operation 166. Again control can be anything displayed on the web page 70 required for the user to properly control the web page logic.

If the control is visible, operation 168 checks to see if all parents are visible for any hierarchical environment associated with the control data. For example, there may be additional text control or other control that operates in combination with the drop down menu 90. For example, panel display logic may control the display of the drop down menu. If this panel display logic does not display the drop down menu, then the airport list retrieved from the web server is also not visible. If this hierarchical control is also not visible, then a failure is returned in operation 170 causing the client event to be queued for later replay in operation 132 of FIG. 8.

Operation 172 determines if the control requires data, and if so, determines if that data is loaded. For example, a combo box may need to be populated with a list of city names before the client event is applied. If operation 172 needs to wait for data to populate control, then a failure is returned in operation 174.

Otherwise, the client event is applied to the associated control in operation 176. A success indication is then returned in operation 178. The successfully processed client event returned in operation 178 completes the client event replay in operations 128 and 130 of FIG. 8. The replay controller 114 then moves back to operation 120 in FIG. 8 and waits for the next client event replay request.

FIG. 10 explains the processing after the interval event timer operation 134 is initiated and fires in FIG. 8. The start interval timer operation 134 may repeat the timer operations in FIG. 10 periodically until there are no more client events in the queue. Any interval time may be set, but in one example, the interval is set to 1 second.

The interval event timer fires in operation 180. Another attempt to process the queued client event is made in operation 182 similar to the attempt made in operation 126 of FIG. 8. In other words, the replay controller 114 again performs the operations described in FIG. 9. If the client event is not successfully processed in operation 184, operation 186 returns and waits for the next timer firing in operation 180. For example, the replay controller 114 waits another second and tries again to process the queued client event in operation 182.

If the client event is successfully processed in operation 184, the client event is removed from the pending action queue in operation 188. If the pending action queue is not empty in operation 190, processing of the next client event in the pending action queue is attempted in operation 182. Otherwise, operation 192 turns off the interval timer. Control is then returned to the replay controller 114 in operation 194. The replay controller 114 responds to any subsequent client event replay requests in operation 120 in FIG. 8.

Thus the operations described above ensure that any asynchronous client UI events are synchronized with the control required for those UI events to be correctly processed.

Reducing Replay Time

Figure 12:
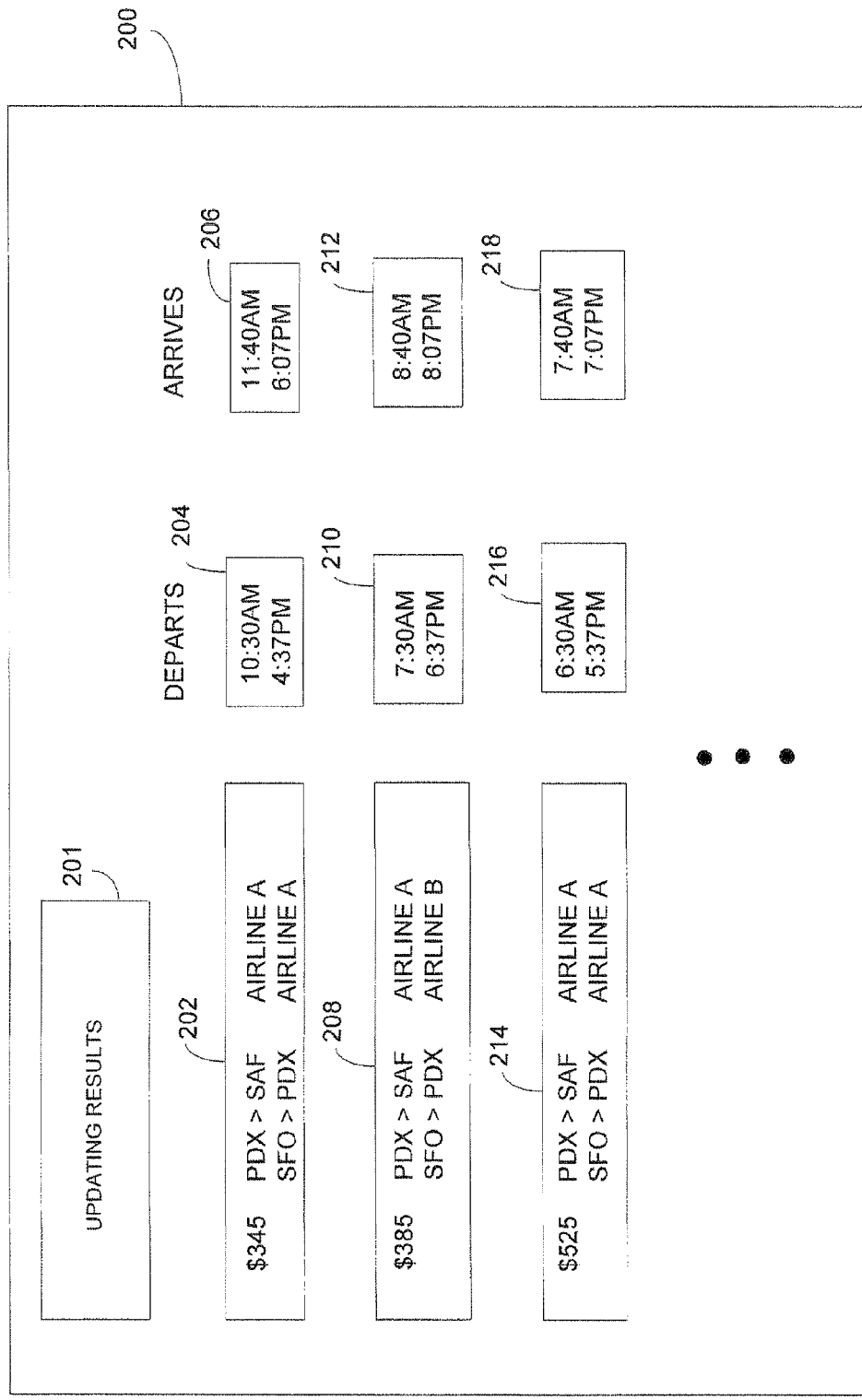
FIG. 12 shows a web page with programmed delay times.

FIG. 11 shows a next state of the web page 70 where entry of data into all of the fields 74-88 have been completed and the user selects the search icon 89. FIG. 12 shows a next web page 200 that is rendered after web page 70 is completed and the search icon 89 selected. The web page 200 shows a partial list of airline reservations that match the criteria previously entered into web page 70. For example, a first listing 202-206 lists the prices, airline, departure, and arrival times for a round trip flight between Portland, Oreg. and San Francisco, Calif. A second listing 208-212 lists the prices, airlines, and times for a second flight and a third listing 214-218 lists the prices, airlines, and times for a third flight between Portland and San Francisco.

Web pages may display partial lists of results while waiting to receive a complete list from a web server. For example, the web page 200 may display the first three flights shown in FIG.

12 while additional flight information is being received from web server 42 in FIG. 1. For example, the web page 200 may have logic that every 4 seconds periodically displays all of the currently received airline information. After each 4 second interval, the code in web page 200 may display any additional flight information that was received from the web server 42. This display process may repeat every 4 seconds until all of the flight information is received from the web server 42. This segmented display technique allows the user to view a partial list of available flights while the remaining flight information is being received from the web server 42.

During a session replay, all of the flight information has already been captured and stored locally in the session archive 40 shown in FIG. 1. Thus, during the replay session it may not be necessary to delay 4 seconds between each set of partially displayed airline flights. To reduce the time required to replay a web session, the code in the web page 200 is altered during replay to remove timing delays associated with network data transfers.

Figure 13:
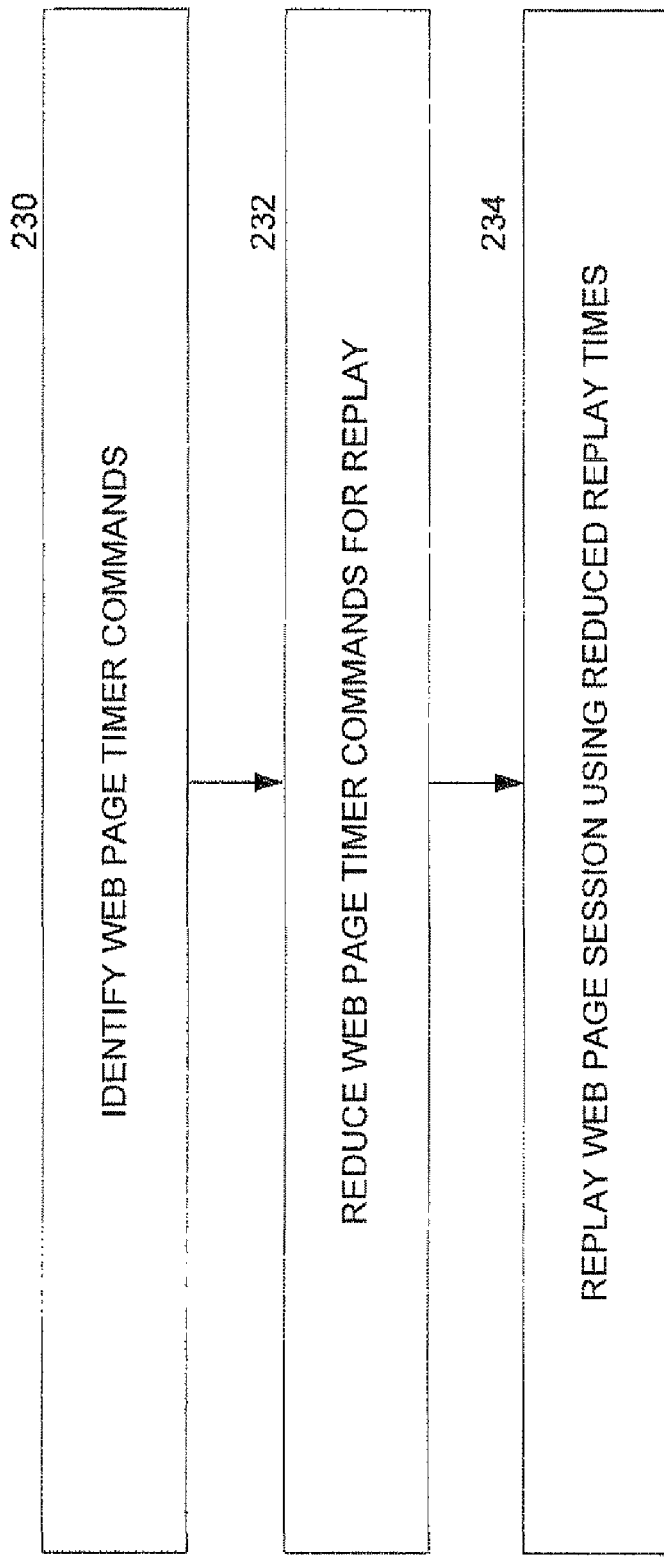
FIG. 13 shows how to reduce the replay time for the web page shown in FIG. 12.

Referring to FIG. 13, the replay controller 114 in operation 230 identifies web page timer commands in the web page logic for the captured web session. For example, the 4 second delay contained in the code for web page 200 shown in FIG. 12. In operation 232, the replay controller 114 either reduces or removes the web page timer values. Operation 234 then replays the web page session using the reduced or removed web page timer commands or values. This allows a user to still accurately replay the captured network session without having to experience the delays that normally occur while exchanging data between the user terminal 13 and the remote web server 42 in FIG. 1.

Displaying Completed Web Pages

Literally hundreds of user interface events may be required to completely fill out web page fields. For example, a web page where a user fills out a loan application may require the user to enter hundreds or thousands of characters and therefore has hundreds or thousands of associated UI events. During replay, a user may want to "cut to the chase" and view the final populated state of the web page. For example, a user may want to go directly to the state of the web page 70 shown in FIG. 11 where all of the, fields for the flight search have already been entered and the user is about to select the search icon 89. FIG. 11 shows the last state of web page 70 just prior to the web browser rendering the next web page 200 shown in FIG. 12.

Figure 14:
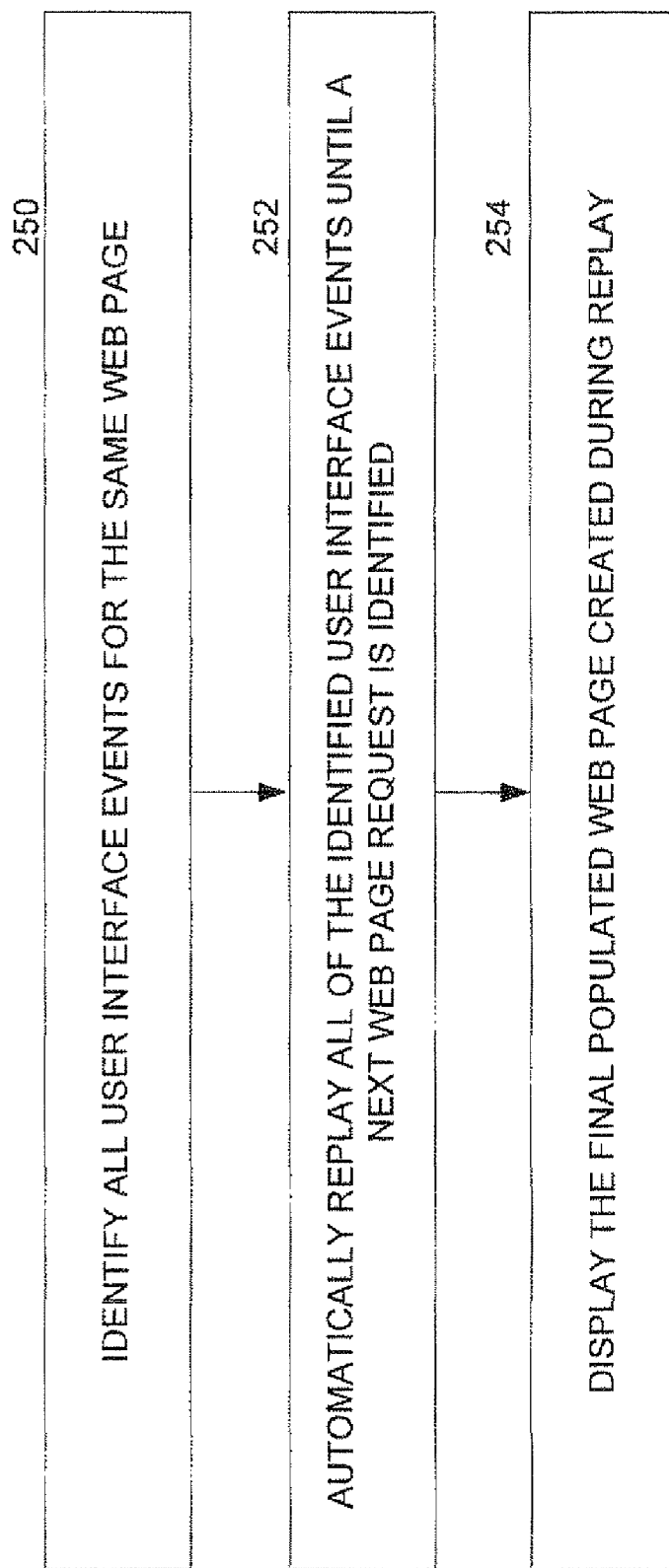
FIG. 14 shows how the replay controller automatically completes replay for individual web pages.

Referring to FIG. 14, the replay controller 114 in operation 250 identifies all of the UI events associated with the same web page. The UI events for the same web page can be identified by identifying and grouping together all of the UI events following the initiation of a new web page through the UI event that causes a next subsequent web page to be rendered.

In operation 252, the replay controller 114 automatically replays all of the UI events associated with the same web page until a next web page request is identified. At this point the replay controller 114 displays the fully populated web page created during the replay. This allows a user to quickly see what information was entered into a web page just prior to the web page being sent to the web server 42.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A method comprising:
capturing control events executed or displayed during a network session;
capturing client events that are entered or executed in response to the executed or displayed control events during the network session;
identifying the client events that are executed in conjunction with associated control events for the network session;
assigning timestamps to the control events and client events;
queuing the control events and the client events in an assigned order according to the assigned timestamps;
replaying the control events and client events by applying the client events to the associated control events according to the assigned order;
monitoring the replaying of the control events and client events;
detecting at least some client events that are not ready to be processed by the associated control events;
waiting for at least some of the associated control events to become visible on a user interface;
requeuing the client events when the associated control events are not visible on the user interface;
executing the queued client events when the associated control events become visible on the user interface;
delaying replaying other queued control events and client events until the detected client events are processed by the associated control events; and
replaying the other client events and other control events in response to the detected client events being processed by the associated control events.

2. The method according to claim 1 further comprising:
capturing asynchronous control events for the network session that execute asynchronously from behavior of the user interface and asynchronously from the client events;
asynchronously replaying the asynchronous control events along with the other control events and client events for the network session;
monitoring replay of the network session to determine when display operations associated with the asynchronous control events are, or would be, visually displayed on the user interface; and
delaying replay of the client events associated with the asynchronous control events until display operations for the asynchronous control events are visually displayed on the user interface.

3. The method according to claim 1 further comprising:
identifying hierarchies of control events associated with the same one or more client events;
requeuing the client events when the associated hierarchy of control events are not visible; and executing the client events only after the entire associated hierarchy of control events are visible.

4. The method according to claim 1 further comprising:
identifying the control events that require data;
requeuing the client events associated with the identified control events until the data is loaded; and
replaying the requeued client events only after the data for the associated control events has been loaded.

5. The method according to claim 1 further comprising:
identifying web page timer commands in the control events or client events;
reducing or eliminating time values specified in the identified web page timer commands; and
replaying the control events or client events using the reduced or eliminated time values.

6. The method according to claim 1 further comprising:
identifying all of the client events associated with a same web page;
automatically replaying all of the identified client events until a next web page request is identified; and
displaying the web page populated after replaying all of the identified client events.

7. A method comprising:
capturing control events executed or displayed during a network session;
capturing client events associated with the control events for the same network session that are entered or executed in response to the control events;
assigning time stamps to the control events and client events;
submitting the control events and the client events to an event handler for replaying according to the assigned time stamps;
determining if other client events for the same network session are currently pending in a queue and determining when attempts to apply the client events to the associated control events are unsuccessful;
placing the client events in the queue when other client events are pending in the queue and when the attempts to apply the client events to the associated control events are unsuccessful;
waiting a predetermined time period, independent of the time stamps, when other client events are currently pending in the queue or when attempts to apply the client events to the associated control events are unsuccessful;
determining after the predetermined time period if one or more of the client events in the queue are successfully applied to the associated control events;
replaying the one or more client events in the queue and removing the client events from the queue when the client events are successfully applied to the associated control events; and
repeatedly waiting the predetermined time period when the one or more client events in the queue cannot be successfully applied to the associated control events and then reapplying the one or more client events in the queue to the associated control events until the one or more client events in the queue are successfully applied to the associated control events.

8. An apparatus, comprising:
a computer configured to:
identify user interface events and control events in a captured network session;
identify the user interface events in the captured network session that are associated with the control events;
assign time stamps to the control events and user interface events;
queue the control events and the user interface events in an assigned order according to the assigned time stamps;
replay the control events and the user interface events according to the assigned order;
detect a replay condition where an identified user interface event is not ready to be processed by an identified control event;
load the identified user interface event into a queue when the identified control event has not completed replay execution;
delay applying the identified user interface event to the identified control event during the replay in response to the detected replay condition; and
resume replay of the control events and user interface events in response to successful processing of the identified user interface event by the identified control event.

9. The apparatus according to claim 8 wherein the computer is further configured to:
periodically check whether the control events associated with an oldest user interface event in the queue has completed replay execution;
replay the oldest user interface event in the queue when the associated control events has been fully executed;
remove the oldest user interface event from the queue; and
repeatedly check whether the control events associated with the next oldest user interface event in the queue have completed replay execution before executing the next oldest user interface event.

10. The apparatus according to claim 8 wherein the computer is further configured to wait until the control events are visible before replaying the associated user interface events.

11. The apparatus according to claim 8 wherein the computer is further configured to identify hierarchies of control events associated with the same user interface events and wait until the entire hierarchies of control events are visible before replaying the associated user interface events.

12. The apparatus according to claim 8 wherein the computer is further configured to identify control events that require data and wait until the required data is loaded before replaying the associated interface events.

13. The apparatus according to claim 8 wherein the computer is further configured to:
identify timer commands in the user interface events or control events;
reduce or remove time values specified in the timer commands; and
replay the user interface events or control events using the reduced or removed time values.

14. The apparatus according to claim 8 wherein the computer is further configured to:
identify all of the user interface events associated with a same web page;
replay all of the identified user interface events associated with the web page in a same batch; and
display the web page after replaying all of the associated user interface events.

15. A system comprising:
a replay device configured to:
identify control events in a captured network session that require execution before replaying associated user interface events;
assign timestamps to the control events and user interface events;
queue the control events and the user interface events in an assigned order according to the timestamps;

replay the control events and user interface events by applying the user interface events to the associated control events according to the assigned order;

identify one of the client events not ready to be processed by an associated one of the control events;

delay replay of the user interface events and control events until the identified one of the user interface events is successfully processed by the associated one of the control events; and resume replay the user interface events and control events in response to the identified one of the user interface events being successfully processed by the associated one of the control events, wherein the identified one of the user interface events is assigned to a queue when the identified one of the user interface events is not ready to be applied to the associated one of the control events and the identified one of the user interface events is serially replayed from the queue after the associated one of the control events has completed execution.

16. The system according to claim 15 wherein the interface events are executed by a client during the network session.

17. The system according to claim 15 wherein the control events include information displayed on a web page that is selected by the associated user interface events.

18. The system according to claim 17 wherein the control events include a list of items that are displayed on a drop down menu and the associated user interface events include a selection event that selects one of items in the displayed list.

* * * * *

UNITED STATES PATENT AND TRADEMARK OFFICE
CERTIFICATE OF CORRECTION

| | | |
|---|---|---|
| PATENT NO. | : 8,042,055 B2 | Page 1 of 1 |
| APPLICATION NO. | : 12/049245 | |
| DATED | : October 18, 2011 | |
| INVENTOR(S) | : Wenig et al. | |

It is certified that error appears in the above-identified patent and that said Letters Patent is hereby corrected as shown below:

Page 2, Column 2, Line 5, (Other Publications), delete "Interation:," and insert -- Interaction:, --, therefor.

Page 2, Column 2, Line 13, (Other Publications), delete "Scince," and insert -- Science, --, therefor.

Column 15, Line 4, Claim 15, delete "client" and insert -- user interface --, therefor.

Column 16, Line 6, Claim 16, after ""wherein the" insert -- user --, therefor.

Signed and Sealed this
Fourth Day of December, 2012

David J. Kappos
*Director of the United States Patent and Trademark Office*